(12) United States Patent
Nanbu et al.

(10) Patent No.: US 6,697,272 B2
(45) Date of Patent: Feb. 24, 2004

(54) CONTACTLESS POWER TRANSMITTING SYSTEM AND CONTACTLESS CHARGING SYSTEM

(75) Inventors: Takafumi Nanbu, Saitama (JP); Atsushi Koshiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/091,987

(22) Filed: Mar. 6, 2002

(65) Prior Publication Data

US 2002/0141208 A1 Oct. 3, 2002

(30) Foreign Application Priority Data

Mar. 9, 2001 (JP) .................................. P2001-067036

(51) Int. Cl.[7] .......................... H02M 3/24; H02M 3/335
(52) U.S. Cl. ................................ 363/97; 363/16
(58) Field of Search ............... 363/37, 39, 41, 363/97, 98, 95, 40, 25, 26, 131, 15, 16, 17

(56) References Cited

U.S. PATENT DOCUMENTS

| | | | | |
|---|---|---|---|---|
| 4,276,586 A | * | 6/1981 | Boekhorst | 363/41 |
| 5,430,633 A | * | 7/1995 | Smith | 363/20 |
| 5,706,184 A | * | 1/1998 | Mizuta et al. | 363/97 |

* cited by examiner

*Primary Examiner*—Rajnikant B. Patel
(74) *Attorney, Agent, or Firm*—Jay H. Maioli

(57) ABSTRACT

A contactless power transmitting system includes a power transmitting circuit and a power receiving circuit that are coupled by a transformer having a primary coil and a secondary coil. The power transmitting circuit includes a switching power supply having a predetermined frequency. The power receiving circuit includes a capacitor that is connected to the secondary coil and that constitutes a resonating circuit in cooperation with the leakage inductance of the secondary coil and a flyback rectifier circuit. The capacitance of the capacitor is set so that the resonant frequency of the resonating circuit is substantially equal to the predetermined frequency of the switching power supply.

4 Claims, 2 Drawing Sheets

FIG. 2

| | CONVENTIONAL EXAMPLE 1 (TRANSFORMER COUPLING, GAP = 0 mm, NON-RESONANT) | CONVENTIONAL EXAMPLE 2 (TRANSFORMER COUPLING, GAP = 3 mm, NON-RESONANT) | EMBODIMENT (TRANSFORMER COUPLING, GAP = 3 mm, RESONANT) |
|---|---|---|---|
| POWER TRANSMISSION EFFICIENCY | 76 % | 28 % | 66 % |

CONTACTLESS POWER TRANSMITTING SYSTEM AND CONTACTLESS CHARGING SYSTEM

BACKGROUND OF THE INVENTION

1. Field of the Invention

The present invention relates to a contactless power transmitting system and a contactless charging system.

2. Description of the Related Art

Conventional contactless charging systems (contactless power transmitting systems) for portable telephones do not have a high power transmission efficiency, since they are affected by leakage inductance.

SUMMARY OF THE INVENTION

In view of the foregoing, it is an object of the present invention to provide a contactless power transmitting system, having a power transmitting circuit and a power receiving circuit which are connected via a transformer, with improved power transmission efficiency.

Another object of the present invention is to provide a contactless charging system, having a power transmitting circuit and a power receiving circuit which are connected via a transformer, with improved power transmission efficiency.

Still another object of the present invention is to provide a contactless power transmitting system, having a power transmitting circuit and a power receiving circuit which are connected via a transformer, with improved power transmission efficiency, and with significantly decreased current flowing through the primary coil of the transformer and with significantly decreased voltage of the secondary coil of the transformer when no load is applied to the rectifier circuit of the power receiving circuit compared to those when a load is applied thereto.

Further object of the present invention is to provide a contactless charging system, having a power transmitting circuit and a power receiving circuit which are connected via a transformer, with improved power transmission efficiency, and with significantly decreased current flowing through the primary coil of the transformer and with significantly decreased voltage of the secondary coil of the transformer when no rechargeable battery is connected to the rectifier circuit of the power receiving circuit compared to those when the rechargeable battery is connected thereto.

In order to achieve these objects, according to a first aspect of the present invention, there is provided a contactless power transmitting system. The contactless power transmitting system includes a power transmitting circuit and a power receiving circuit which are coupled by a transformer having a primary coil and a secondary coil. The power transmitting circuit includes a switching power supply having a predetermined frequency. The power receiving circuit includes a capacitor which is connected to the secondary coil and which constitutes a resonating circuit in cooperation with the leakage inductance of the secondary coil; and a flyback rectifier circuit. The capacitance of the capacitor is set such that the resonant frequency of the resonating circuit is substantially equal to the predetermined frequency of the switching power supply.

According to a second aspect of the present invention, there is provided a contactless charging system. The contactless charging system includes a power transmitting circuit and a power receiving circuit which are coupled by a transformer having a primary coil and a secondary coil. The power transmitting circuit includes a switching power supply having a predetermined frequency. The power receiving circuit includes a capacitor which is connected to the secondary coil and which constitutes a resonating circuit in cooperation with the leakage inductance of the secondary coil; and a flyback rectifier circuit to be connected to a rechargeable battery. The capacitance of the capacitor is set such that the resonant frequency of the resonating circuit is substantially equal to the predetermined frequency of the switching power supply.

In the first aspect of the present invention, preferably, the turns ratio of the primary coil to the secondary coil of the transformer is set such that the difference between the resonant frequency of the resonating circuit when a load is connected to the rectifier circuit and the resonant frequency of the resonating circuit when the load is not connected thereto becomes large.

In the second aspect of the present invention, preferably, the turns ratio of the primary coil to the secondary coil of the transformer is set such that the difference between the resonant frequency of the resonating circuit when the rechargeable battery is connected to the rectifier circuit and the resonant frequency of the resonating circuit when the rechargeable battery is not connected thereto becomes large.

BRIEF DESCRIPTION OF THE DRAWINGS

FIG. 2 is a table comparing the power transmission efficiencies of the embodiment and a conventional example.

DESCRIPTION OF THE PREFERRED EMBODIMENT

Figure 1A:
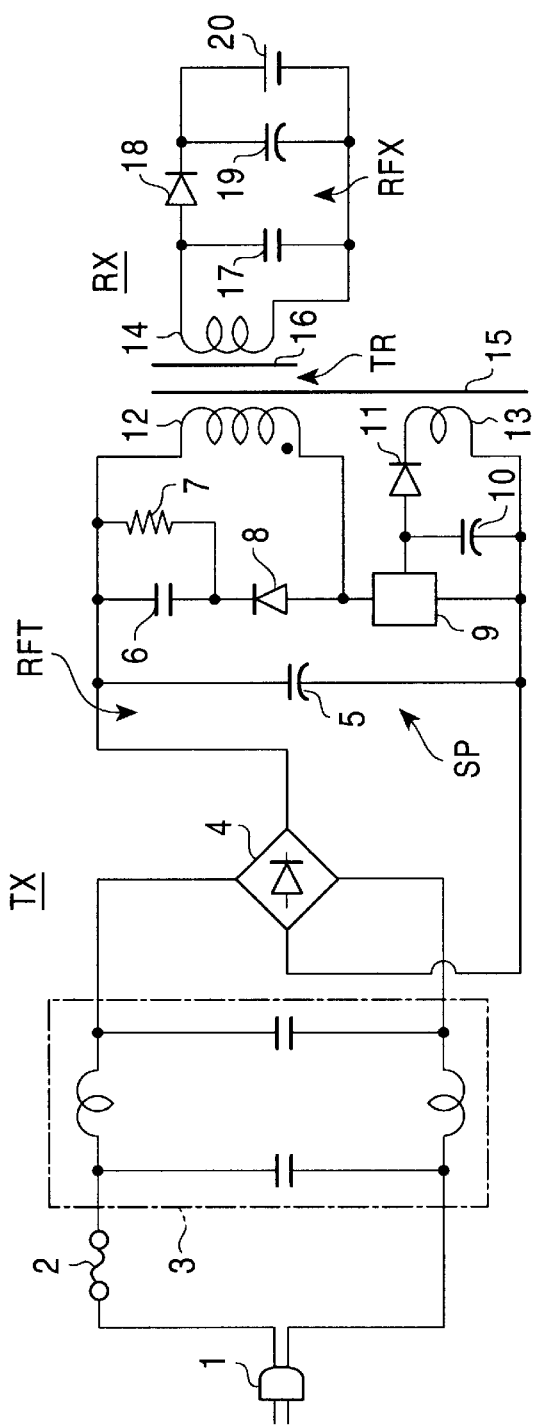
FIG. 1A is circuit diagram illustrating an exemplary contactless power transmitting system (contactless charging system) according to a first embodiment of the present invention.

A contactless power transmitting system (contactless charging system) according to an embodiment of the present invention will now be described with reference to FIG. 1A. The contactless power transmitting system (contactless charging system) is constituted by a power transmitting circuit TX and a power receiving circuit RX. Electric power is transmitted from the power transmitting circuit TX to the power receiving circuit RX through a transformer TR, and the transmitted electric power is rectified, and the resulting direct current (DC) voltage is applied to a rechargeable battery 20, which serves as a load, to become charged.

First, the power transmitting circuit TX will be described. A pair of wires leading from a plug 1 to be connected to an outlet of a commercial alternating current (AC) power supply are connected to a pair of positive input terminals of a bridge rectifier 4, which constitutes a rectifier circuit RFT, through a fuse 2 and a noise rejection filter 3. A smoothing capacitor (electrolytic capacitor) 5, which constitutes the rectifier circuit RFT, is connected between the positive output terminal and the negative output terminal of the rectifier 4.

A switching circuit (integrated circuit) 9 includes an oscillation circuit, a control circuit, and an output circuit. One end of the switching circuit 9 is connected to the positive output terminal of the rectifier 4 through a primary coil 12 that constitutes a transformer TR, while the other output terminal of the switching circuit 9 is connected to the negative output terminal of the rectifier 4.

A capacitor 6, a resistor 7, and a diode 8 constitute a suppression circuit for suppressing a back electromotive voltage generated in the primary coil 12 of the transformer 12. The cathode of the diode 8 is connected to the positive output terminal of the rectifier 4 through the capacitor 6 and the resistor 7 which are connected in parallel, while the anode of the diode 8 is connected to the one of the switching circuit 9.

A capacitor (electrolytic capacitor) 10, a diode 11, and a feedback coil 13 of the transformer TR constitute a feedback circuit for oscillation control. One end of the feedback coil 13 is connected to the cathode of the diode 11, the anode of which is in turn connected to the input terminal of the switching circuit 9. The capacitor 10 is connected between the anode of the diode 11 and the other end of the feedback coil 13.

Next, the power receiving circuit RX will be described. The power receiving circuit RX includes a flyback rectifier circuit RFX. A resonating capacitor 17 is connected in parallel with both ends of a secondary coil 14 of the transformer TR. The anode of a rectifying diode 18, which constitutes the rectifier circuit RFX, is connected to one end of the secondary coil 14, while the cathode of the rectifying diode 18 is connected to the other end of the secondary coil 14 through a smoothing capacitor (electrolytic capacitor) 19 that constitutes the rectifier circuit RFX. The positive terminal of the rechargeable battery (e.g., a lithium-ion battery built into a portable telephone) 20 serving as a load is connected to the cathode of the diode 18, and the negative terminal of the rechargeable battery 20 is connected to the other end of the secondary coil 14.

In the transformer TR, the primary coil 12 and the secondary coil 14 are wound around cores 15 and 16, respectively. The feedback coil 13 is also wound around the core 15.

Figure 1B:
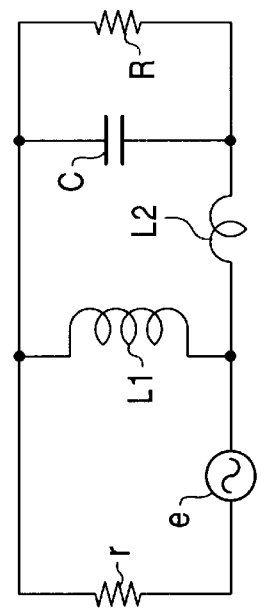
FIG. 1B is a circuit diagram illustrating the equivalent circuit of the contactless power transmitting system (contactless charging system)

FIG. 1B illustrates an equivalent circuit of the receiving circuit RX, viewed from the primary coil 12 of the transformer TR. Reference symbol e indicates an AC back electromotive voltage when the switching circuit 9 is in operation, and the AC back electromotive voltage has a frequency f. Reference symbol r indicates an equivalent resistance of the suppression circuit, which is constituted by the capacitor 6, the resistor 7, and the diode 8, for suppressing the back electromotive voltage. Reference symbol L1 indicates the inductance of the primary coil 12, and L2 indicates the leakage inductance of the secondary coil 14. Reference symbol C indicates a capacitance converted from the capacitance of the capacitor 17 into that of the primary side of the transformer TR.

In the equivalent circuit in FIG. 1B, when the capacitance C is selected such that the resonant frequency of the circuit constituted by the resistance r, the inductance L1, the capacitance C, and the resistance R is equal to the frequency f of the AC back electromotive voltage e, the presence of the leakage inductance L2 of the secondary coil 14 can be ignored.

In the equivalent circuit in FIG. 1B, assuming that the resistance r and the inductance L1 that seem to have a small influence on the resonant frequency are absent, the square of the resonance angular frequency ω of the equivalent circuit in FIG. 1B can be expressed by the equation:

$$\omega^2 = 1/L2 \cdot C - 1/2C^2R^2$$

The ω2 in the equation 1 shows that the heavier, i.e., the smaller the load resistance R is, the more reduced the resonance angular frequency ω is. Accordingly, optimally setting the turns ratios of the primary coil 12 and the secondary coil 14 of the transformer TR in terms of the resonance angular frequency and the load matching when the load resistance R is heavy and light (i.e. the rechargeable battery 20 is not connected to the rectifier circuit RFX) can reduce an increase in current flowing through the primary coil 12 at no load and an increase in the terminal voltage in the secondary coil 14. This can reduce unnecessary power consumption and can use low pressure-proof circuit components for the secondary coil 14 side of the transformer TR, that is, in the power receiving circuit RX.

As an example, when the number of turns of the primary coil 12 of the transformer TR was 50, the number of turns of the secondary coil 14 was ten, the number of turns of the feedback coil 13 was eight, and the capacitance of the capacitor 17 was 332 pF (0.039 $\mu$F when converted into a capacitance of the secondary coil 14 side), the resonant frequencies of the resonating circuit at the secondary coil 14 side became 100 kHz when loaded and 530 kHz at no load. In addition, under the condition, when the load resistance was 10 Ω, the primary current (an electric current flowing through the primary coil 12) became 124 mA and the secondary voltage (a voltage in the rectifier circuit RFX at the secondary coil 14 side) became 8.6 V. When no load was applied, the primary current became 27 mA and the secondary voltage became 7.7 V.

Additionally, since the rectifier circuit RFX in the power receiving circuit RX is configured with a flyback rectifier circuit, a considerably high voltage can be provided compared to a forward rectifier circuit when the gaps between the cores are the same.

In Table 2, the power transmission efficiency of the contactless power transmitting system (contactless charging system), shown in FIG. 1, of the embodiment of the present invention is compared with the power transmission efficiencies of a contactless power transmitting system (contactless charging system) of a first conventional example and a contactless power transmitting system (contactless charging system) of a second conventional example are compared. In the system of the present invention, the secondary voltage when loaded was 9.4 V, the gap (distance) between the cores 15 and 16 of the primary coil 12 and the secondary coil 14 of the transformer TR was 3 mm. In the system of the first conventional example, it was transformer coupling, the secondary voltage when loaded was 8 V, the core gap was 0 mm, the secondary coil was non-resonant, and the resonating circuit at the secondary coil side was a forward type. In the system of the second conventional example, it was transformer coupling, the secondary voltage when loaded was 4.2 V, the core gap was 3 mm, the secondary coil was non-resonant, and the resonating circuit at the secondary coil side was a forward type. In all the cases of the embodiment and the first and second conventional examples, the switching frequencies of the switching circuits were 100 kHz, and the load resistances when loaded were 10 Ω.

The contactless power transmitting system (contactless charging system) of the embodiment displayed a power transmission efficiency of 66%, which did not reach 76% of the first conventional example with the 0-mm core gap, but is substantially comparable thereto. Meanwhile, compared to 28% of the second conventional example with the 3-mm core gap, the system of the present invention displayed sufficiently high power transmission efficiency.

While the contactless charging system according to the embodiment of the present invention has been described in the context of a charging system for a rechargeable battery built into a portable telephone, the present invention can equally be applied to a charging system for a rechargeable battery built into a cordless electric water pot, electric shaver, or the like.

In addition, while the contactless charging system according to the embodiment of the present invention has been described in connection with a charging system for charging a rechargeable battery built into a portable telephone, the present invention can also be applied to a contactless switching power supply system or the like.

What is claimed is:

1. A contactless power transmitting system comprising:
a power transmitting circuit and a power receiving circuit inductively coupled by a two-piece transformer having a primary coil and a separate, spaced-apart secondary coil that can be separated from said primary coil,
said power transmitting circuit including:
a switching power supply having a predetermined frequency, and
said power receiving circuit including:
a capacitor connected to the secondary coil so as to form a secondary resonating circuit in cooperation with a leakage inductance of the secondary coil; and
a flyback rectifier circuit,
wherein a capacitance of the capacitor is set so that a resonant frequency of the secondary resonating circuit is substantially equal to the predetermined frequency of the switching power supply.

2. A contactless charging system comprising:
a power transmitting circuit and a power receiving circuit inductively coupled by a two-piece transformer having a primary coil and a separate, spaced-apart secondary coil that can be separated from said primary coil,
said power transmitting circuit including:
a switching power supply having a predetermined frequency, and
said power receiving circuit including:
a capacitor connected to the secondary coil so as to form a secondary resonating circuit in cooperation with a leakage inductance of the secondary coil; and
a flyback rectifier circuit for connection to a rechargeable battery,
wherein a capacitance of the capacitor is set so that a resonant frequency of the secondary resonating circuit is substantially equal to the predetermined frequency of the switching power supply.

3. The contactless power transmitting system according to claim 1, wherein a turns ratio of the primary coil to the secondary coil of the transformer is set so that a difference between the resonant frequency of the secondary resonating circuit when a load is connected to the rectifier circuit and the resonant frequency of the secondary resonating circuit when the load is not connected thereto is large.

4. The contactless charging system according to claim 2, wherein a turns ratio of the primary coil to the secondary coil of the transformer is set so that a difference between the resonant frequency of the secondary resonating circuit when the rechargeable battery is connected to the rectifier circuit and the resonant frequency of the secondary resonating circuit when the rechargeable battery is not connected thereto is large.

* * * * *